Dec. 30, 1958 R. C. SWAIN ET AL 2,866,436
LEASH AND HANDLE THEREFOR
Filed Oct. 24, 1956
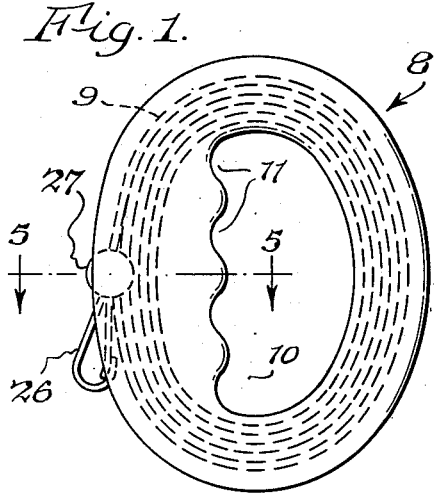
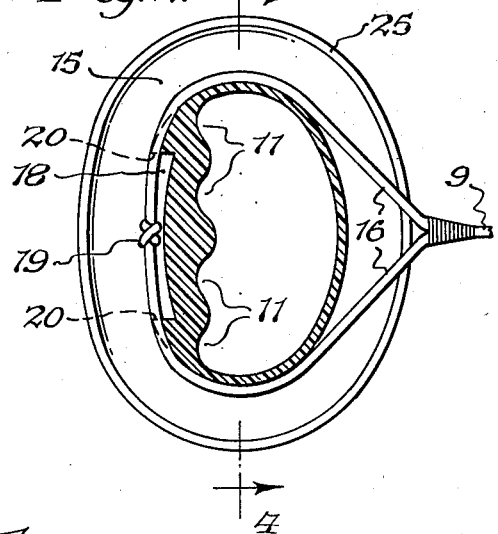
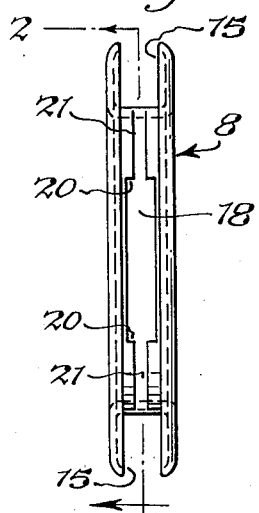
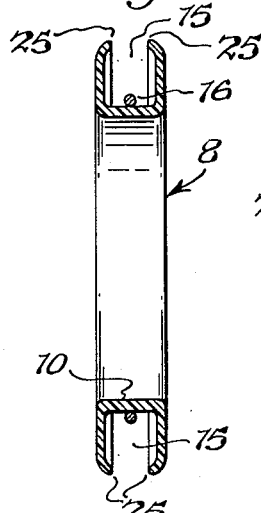
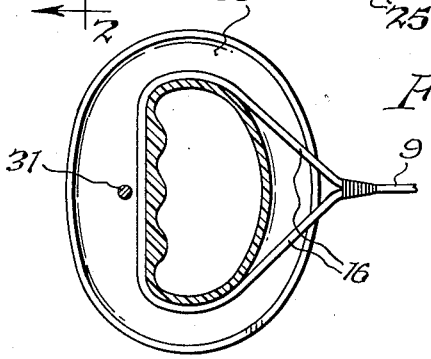
INVENTORS
Russell C. Swain
Alexander Szarejko
BY
Parker & Sindman
Attorneys.

United States Patent Office

2,866,436
Patented Dec. 30, 1958

2,866,436
LEASH AND HANDLE THEREFOR

Russell C. Swain and Alexander Szarejko, Jr., Buffalo, N. Y.

Application October 24, 1956, Serial No. 617,965

6 Claims. (Cl. 119—109)

This invention relates to leashes of the kind used for controlling children, dogs or other animals, and which have a handle forming a reel on which the leash may be wound.

Leashes of this kind have sometimes been found inconvenient and tiring to use because the animal will run in different directions from the person holding the leash, thus subjecting the person's hand or arm to various twists. It is consequently an object of this invention to provide a leash handle or reel of improved construction on which the leash is so secured that the movements of the child or animal in different directions will not subject the user of the leash to any unusual twists or strains. A further object is to provide a leash which can be looped around the reel when not in use or when it is desired to shorten the leash.

It is also an object to provide the reel with means for holding the outer ends of the leash when the same is wound around the reel or handle so that the handle and leash form a compact unit.

Other objects and advantages of this invention will appear from the following description and claims.

Fig. 1 is a face view of the handle or reel embodying this invention having the leash wound thereon and its end secured thereto.

Fig. 2 is a sectional view thereof on line 2—2, Fig. 3.

Fig. 3 is an edge view thereof.

Fig. 4 is a sectional view thereof on line 4—4, Fig. 2.

Fig. 5 is a fragmentary, sectional view thereof on line 5—5, Fig. 1.

Fig. 6 is a face view of one-half of a handle of modified construction.

8 represents a reel or handle for use in connection with a leash 9. The reel may be of any desired shape, that shown having a substantially elliptical periphery and having an opening through the middle portion thereof through which four fingers of a hand may be passed. This opening is shaped to form a hand grip 10 and may be provided at one side thereof with a series of depressions or recesses 11 in which the fingers of a hand may fit.

The handle or reel may be made of a single piece of material or may be made of two halves suitably secured together. The handle may be made of molded plastic material or other suitable material and has about its periphery a groove or recess 15 which extends completely around the reel and into which the leash may be wound.

The leash 9 is provided at its inner end with a loop 16 which extends into the groove 15 and by means of which the leash is attached to the handle. This loop is movable lengthwise of the groove so that it may slide in the groove according to the direction of the pull exerted on the same by a child or an animal. It has been found that by attaching the leash to the handle in such a way that the leash may move to a limited extent in the groove of the handle, the holding of the leash is less tiring on the hand and wrist of the user. This loop, of course, may be formed in any desired manner, namely by tying or otherwise fastening one end of the leash, after passing it into the groove, to the main part of the leash.

It is also desirable to limit the extent to which the loop may slide in the groove of the handle. This may be accomplished in any desired manner, and in the construction shown for this purpose, the handle is provided in the bottom of the groove with a recess 18 and the loop portion of the leash is provided with an enlargement 19 of any suitable type, such for example as a knot in the leash which extends into the recess 18 and which will engage with either end of the recess so as to stop further sliding of the loop in the groove. The recess terminates at opposite ends in shoulders 20 which are formed so as to engage with the enlargement or knot 19 to stop the sliding of the loop in the groove. In order to make certain that the enlargement 19 of the loop will remain in the recess 18, the recess 18 terminates at opposite ends thereof in extensions 21 which are of materially less width than the recess 18 so that the leash or parts thereof adjacent to the enlargement 19 may slide in these extensions, the extensions however being of such narrow width that the enlargement 19 of the loop will be prevented from entering the extensions 21 by the shoulders 20 at the ends of the recess 18. The extensions 21 of the recess taper in depth so that the bottoms of these extensions at their outer ends are flush with the inner surface of the groove 15. Consequently, it will be obvious from an inspection of Figs. 2 and 3 that the loop 16 can only move in the direction of the length of the groove 15 to the extent determined by the length of the recess 18. This limitation on the sliding of the loop in the groove facilitates considerably the handling of the leash and also this limitation on the movement of the loop will make it possible to wind the leash around the handle into the groove and to retain the leash in the wound-up position, since the sliding of the wound-up leash in the groove is prevented by engagement of the enlargement 19 with shoulders at an end of the recess 18.

It is also desirable to secure the outer end of the leash in fixed relation to the handle when the leash is wound into the groove of the handle so that the handle with the leash wound thereon, as indicated in Fig. 1, can be readily carried without unwinding. Any suitable means for accomplishing this result may be employed. In the construction illustrated by way of example, the edge portion of the handle at the groove 15 is provided with slightly inwardly extending flanges or projections 25, and the leash is provided adjacent to the outer end thereof near the hook 26 with an interlock which, for example, may be in the form of a ball having a hole through which the leash passes, this interlock 27 being of such size that it may pass between the flanges 25 if some pressure is applied to the interlock of the leash. If the handle is made of a relatively resilient material, the flanges 25 can be flexed sufficiently to permit the ball or other interlock on the outer end of the leash to pass between these flanges. If the handle is made of a rigid material, the interlock or ball 27 may be made of a resilient material so that it will flex and pass between the flanges 25. In this manner the leash, when wound up on the handle, is prevented from moving in the groove relatively to the handle by the recess 18 and by the cooperation of the outer end of the leash with the handle.

In Fig. 6 is shown a modification of the construction shown in Figs. 1–5. In Fig. 6 the handle is formed in approximately the same manner as shown in Figs. 1–5. In this construction the recess 18 shown in Figs. 1–5 is omitted but instead the sliding of the loop in the groove is limited by means of a pin or part 31 extending across the groove in such manner that a part of the loop extends between the pin and the bottom of the groove. It will be obvious that this pin will limit the extent to which the loop may slide relatively to the handle. Otherwise the handle may be similar in construction to that shown in Figs. 1–5.

The manner of using the leash and handle will be obvious. The groove in the handle can be made of sufficient size so that a relatively long leash may be used, and this can be shortened by only partly unwinding the leash from the handle. The interlock may be pressed into the groove at any part of the periphery of the handle so that the leash in the groove is held from unwinding. When wound on the handle, the leash is in compact form so that it and the handle can be readily stored in a home or automobile or placed in a pocket or handbag. The handle easily fits the hand so that it is much easier to control an animal than with leashes as now commonly used. The leash is easily wound on the handle so that it need not be trailed on the ground. When in use, the handle provides an extended surface for contact with a hand, so that pulls on the leash will not hurt the hand.

It will be understood that various changes in the details, materials and arrangements of parts which have been herein described and illustrated in order to explain the nature of the invention may be made by those skilled in the art within the principle and scope of the invention as expressed in the appended claims.

We claim:

1. A leash and a single-piece handle therefor, said handle being of slightly oval disk shape and having a continuous open groove in its periphery into which the leash may be wound and having an opening extending through said handle and surrounded by said groove and of sufficient size to enable fingers of a hand to be passed through the same to grip the handle, said leash having the inner end thereof formed into a loop arranged loosely in said groove to permit said loop to slide about the bottom of said groove and to enable said bottom to oppose strains on the leash, and means for limiting the extent to which said loop may slide in said groove.

2. A leash and a handle therefor according to claim 1 and including a recess in a part of said groove and a part on said loop which projects into said recess and which stops the movement of said loop when said loop part comes to an end of said recess.

3. A leash handle according to claim 1 and including a part extending across said groove and spaced from the bottom of the groove, a part of said loop passing through the space between said part and the bottom of said groove to limit the extent to which the loop may slide in said groove.

4. A leash and a handle therefor, said handle being of disk shape and having an opening extending through the same of sufficient size to enable fingers of a hand to be passed through the same to grip the handle, said handle having a continuous groove in its periphery into which the leash may be wound, said leash having the inner end thereof formed into a loop arranged loosely in said groove to permit said loop to slide around the bottom of said groove, and means on the outer end of said leash which may be releasably connected with said handle for holding said leash wound on said handle.

5. A leash and a handle therefor, said handle being of disk shape and having an opening extending through the same of sufficient size to enable fingers of a handle to be passed through the same to grip the handle, said handle having a groove in its periphery into which the leash may be wound, said leash having the inner end thereof formed into a loop arranged loosely in said groove to permit said loop to slide lengthwise of said groove, the walls of said groove having inwardly extending flanges extending partly across the open face of said groove, and a part adjacent to the outer end of said leash formed to enter between said flanges to removably secure the outer end of said leash to said handle.

6. A leash and a handle therefor, said handle being of disk shape and having an opening extending through the same of sufficient size to enable four fingers to be passed through the same to grip the handle, said handle having a continuous open groove in its periphery into which the leash may be wound, said leash having the inner end thereof formed into a loop arranged loosely in said groove to permit said loop to slide about the bottom of said groove and to enable the bottom of the groove to oppose strains on said leash, and means on said handle cooperating with said loop to limit the extent to which said loop may slide in said groove, said recess in said groove having a wide portion which terminates in shoulders at its ends which limit the movement of said loop part, and narrow portions extending beyond said wide portion and which are of sufficient width to receive said leash, but not to receive said loop part.

References Cited in the file of this patent

UNITED STATES PATENTS

| 1,982,042 | Basler | Nov. 27, 1934 |
| 2,314,504 | Lifchultz | Mar. 23, 1943 |
| 2,573,219 | Purcell | Oct. 30, 1951 |
| 2,685,283 | Bucklin | Aug. 3, 1954 |

FOREIGN PATENTS

| 155,598 | Germany | Nov. 12, 1904 |